Oct. 9, 1934.    F. L. DUNN    1,976,606
CARD PUNCHING DEVICE
Filed July 21, 1932    4 Sheets-Sheet 1
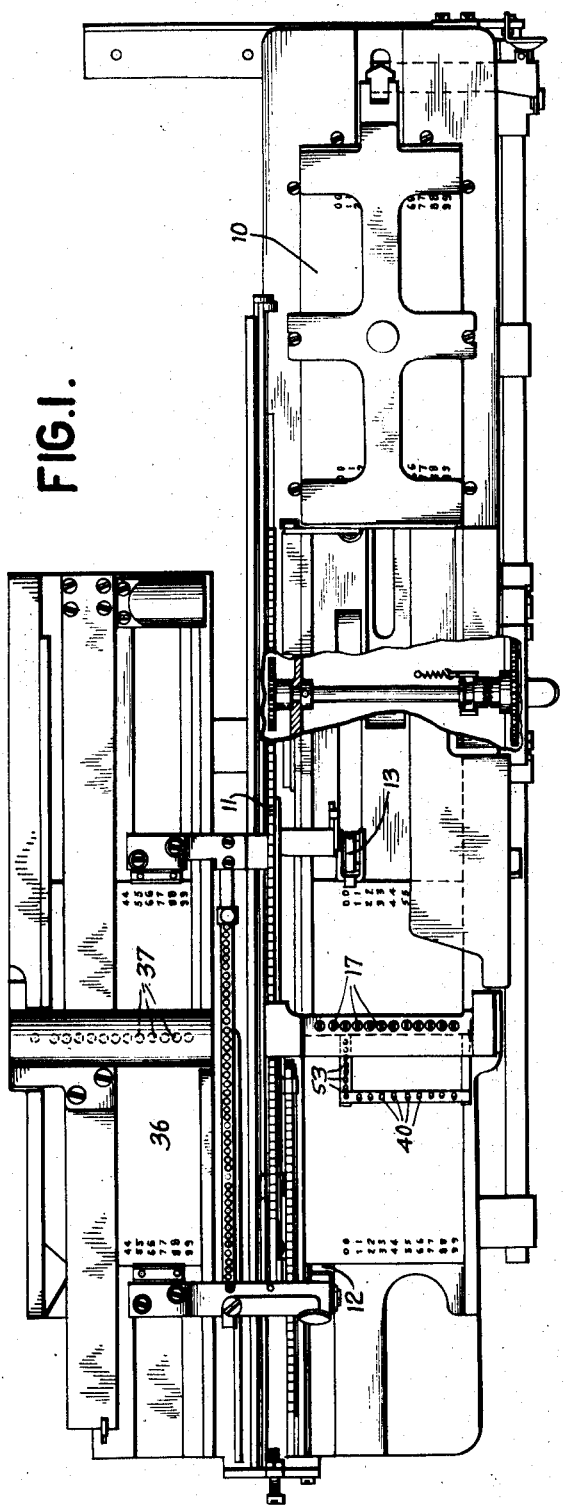
INVENTOR
Francis L. Dunn
BY
A. C. Maby
ATTORNEY Oct. 9, 1934.    F. L. DUNN    1,976,606
CARD PUNCHING DEVICE
Filed July 21, 1932    4 Sheets-Sheet 2

INVENTOR
Francis L. Dunn
BY
A. C. Maby
ATTORNEY

Oct. 9, 1934.　　　　F. L. DUNN　　　　1,976,606
CARD PUNCHING DEVICE
Filed July 21, 1932　　　4 Sheets-Sheet 3

Oct. 9, 1934.          F. L. DUNN          1,976,606
CARD PUNCHING DEVICE
Filed July 21, 1932          4 Sheets-Sheet 4

INVENTOR
Francis L. Dunn
BY
ATTORNEY

Patented Oct. 9, 1934

1,976,606

UNITED STATES PATENT OFFICE 1,976,606

CARD PUNCHING DEVICE

Francis L. Dunn, Pittsburgh, Pa., assignor, by mesne assignments, to International Business Machines Corporation, New York, N. Y., a corporation of New York Application July 21, 1932, Serial No. 623,695

8 Claims. (Cl. 164—115)

This invention relates to punching machines and more particularly to machines for automatically punching complements in fields of a record card.

Record cards designed for use with tabulating machines which analyze positive and negative data on record cards and tabulate balances derived from computations effected by such data are usually provided with a pair of fields each comprising several columns in one of which fields a true number is perforated and in the other of which the true or tens complement of the number is perforated. In preparing such a card, the operator has usually punched the true number directly in the card and has then mentally determined the tens complement of the number and punched it in the second field. Obviously, where the entire punching operation is dependent upon the skill and accuracy of the operator, numerous errors are bound to occur and in order to verify the punching, each individual entry must be carefully checked both as to accuracy of the conversion of the number into its tens complement and the location of the perforations on the card. To do this entails considerable time and effort and does not entirely eliminate the possibility of error since the verifying operator may make the same mistake as the punch operator.

It is an object of the present invention, therefore, to provide a punching mechanism whereby the punch operator need merely perforate the true number in one field of the card after which the machine will automatically punch the tens complement of the number in the second field in its proper form. This eliminates the human factor to a great extent and verification of the punching may then be confined to the original true number entry, thus also saving time and effort in the operation of verifying.

Where each denominational order of a true number contains a significant figure the conversion consists in simply translating the units order into its tens complement and the remaining orders into complements of nine, thus the tens complement of 0032754 is 9967246. However, where the lowest orders contain zeros as in the number 0090700, it is the thousands order which must be converted to its tens complement and all higher order to their nine complements. Thus the entire complement of 0090700 will be 9909300.

It is a further object of the invention to automatically determine the denominational order to be complemented to ten and effect such conversion.

Various other objects and advantages of the invention will be obvious from the following particular description of one form of mechanism embodying the invention or from an inspection of the accompanying drawings; and the invention also constitutes certain new and novel features of construction and combination of parts hereinafter set forth and claimed.

In the drawings:

Fig. 1 is a plan view of one form of punching machine to which the present invention may readily be applied;

Fig. 2 is a detail of a record card showing a pair of fields which receive a true number and its tens complement;

Figure 6:
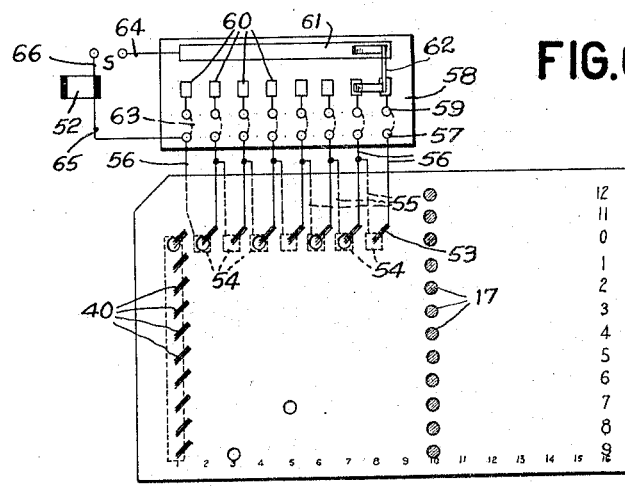
Figure 7:
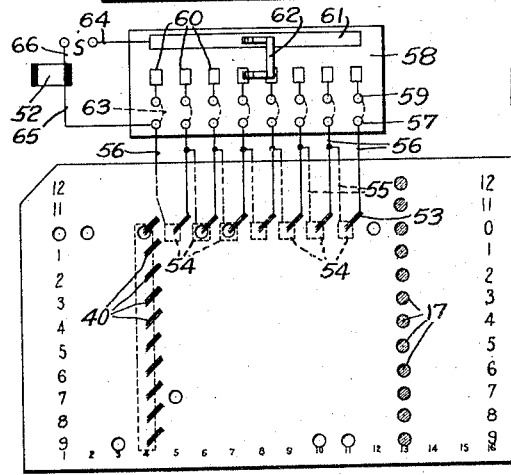
Figure 8:
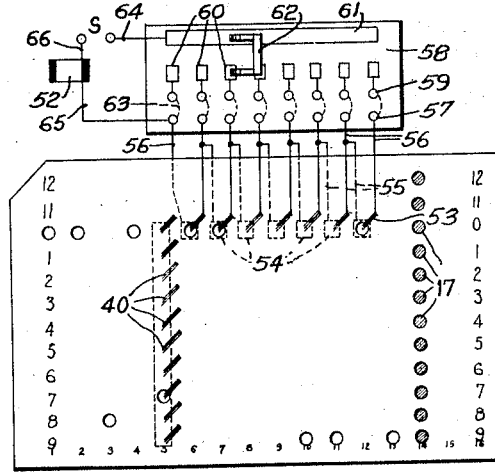

Figs. 6, 7, and 8 are diagrams showing the complement-controlling circuit connections, with the card shown in various positions.

Before proceeding with the explanation of the invention, a brief description will be given of the operation of the punching machine which may be of the type which is fully shown and described in the patent to Lee and Phillips, No. 1,772,186, granted August 5, 1930.

Cards are fed singly from the bottom of a stack 10 (Fig. 1) into a punch carriage comprising an escapement rack 11 which carries forward guide 12 and rear pusher 13. Rack 11 is urged toward the left by the usual spring barrel and pinion mechanism 14 (Fig. 5) and permitted to advance step by step by the usual escapement pawl structure generally designated 15, which is operated to advance the rack 11 one tooth for each oscillation of the escapement rod 16. Repeated oscillations of rod 16 will cause the card in the carriage to advance column by column beneath a row of transversely arranged punches 17.

Figure 3:
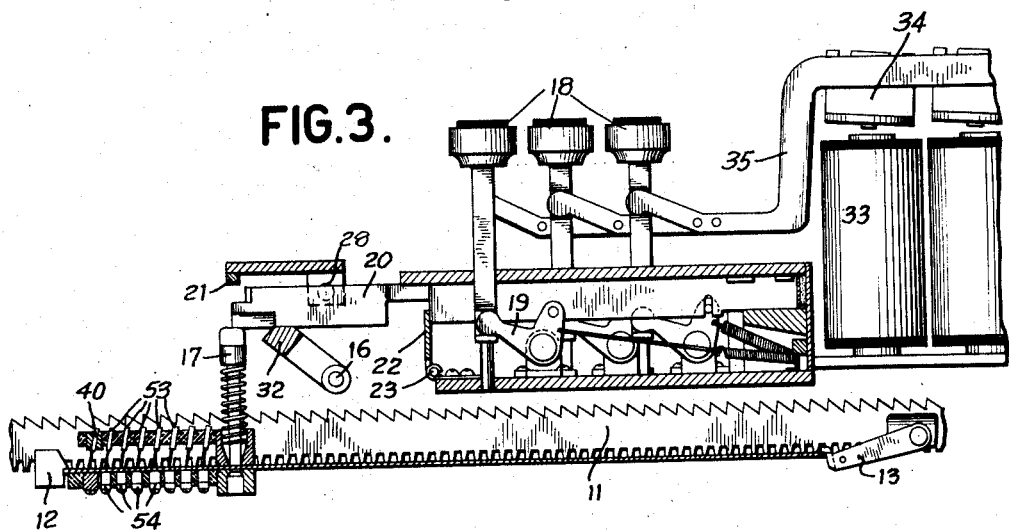
Fig. 3 is a detail of the punching mechanism.
Figure 4:
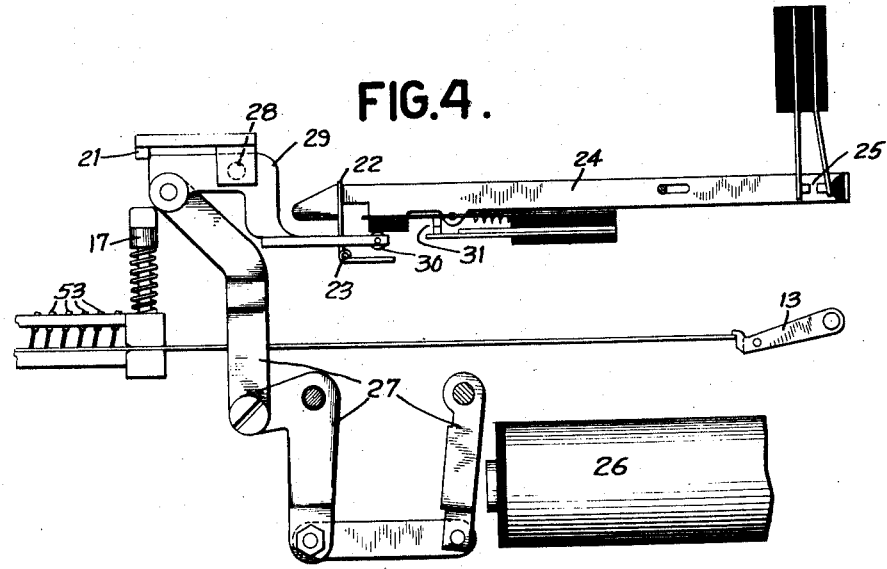
Fig. 4 is a further detail of the punching mechanism.

Referring now to Fig. 3, depression of any key 18, of which there is one for each index point position of the record card, will rock a bell crank 19 in a counterclockwise direction and move an interposer bar 20 to the left, bringing its widest portion directly beneath punch bar 21 and directly above the corresponding punch 17. Movement of interposer 20 to the left will also rock a plate 22, pivoted at 23. Plate 22 upon being so rocked will draw a link 24 (Fig. 4) to the left by virtue of engagement of its hooked end with plate 22 and will close a pair of contacts 25. These contacts are in series with punch magnet 26 and upon closure will cause energization of the magnet to actuate linkage 27 to rock punch bar 21 downwardly about pivot 28, forcing interposer 20 against punch 17 and pressing the latter through the card. Rocking of member 29 integral with bar 21 will cause a roller 30 thereon to open contacts 31 also in series with magnet 26 to deenergize the magnet after punching has been effected. Depression of the left end of interposer 20 will also depress a bail 32 (Fig. 3) rocking rod 16 to effect a spacing operation, upon return of interposer 20 to its normal position. In this manner successive actuation of keys 18 will cause the corresponding punches 17 to perforate successively presented columns of the record card. Magnets 33 are also provided with armatures 34 connected by arms 35 to the stems of keys 18. Energization of any magnet 33 will actuate its corresponding key 18 to actuate a punch in the same manner as direct depression of the key itself. These magnets 33 are usually energized under control of perforations in a master or pattern card 36 (Fig. 1) which is analyzed by the usual sensing devices 37 to duplicate in corresponding columns of the card under the punches, data appearing on the pattern card. The operation of the punching machine thus far described is well known and fully set forth in more specific detail in the patent to Lee and Phillips and it is not considered necessary to explain the same in further detail in this application.

The improvements for carrying out the present invention will now be explained in somewhat greater detail.

Located in advance of the column of punches 17 is a parallel column of sensing brushes 40 (see Figs. 1 and 5) adapted to analyze the perforations made by punches 17, column by column, as the card continues in its movement toward the left. These brushes 40 are connected by wires 41 to blades 42 of a so-called gang, or multi-contact, relay device. Blades 42 are normally in contact with blades 43 which are connected by wires 44 to the punch interposer magnets 33.

Figure 5:
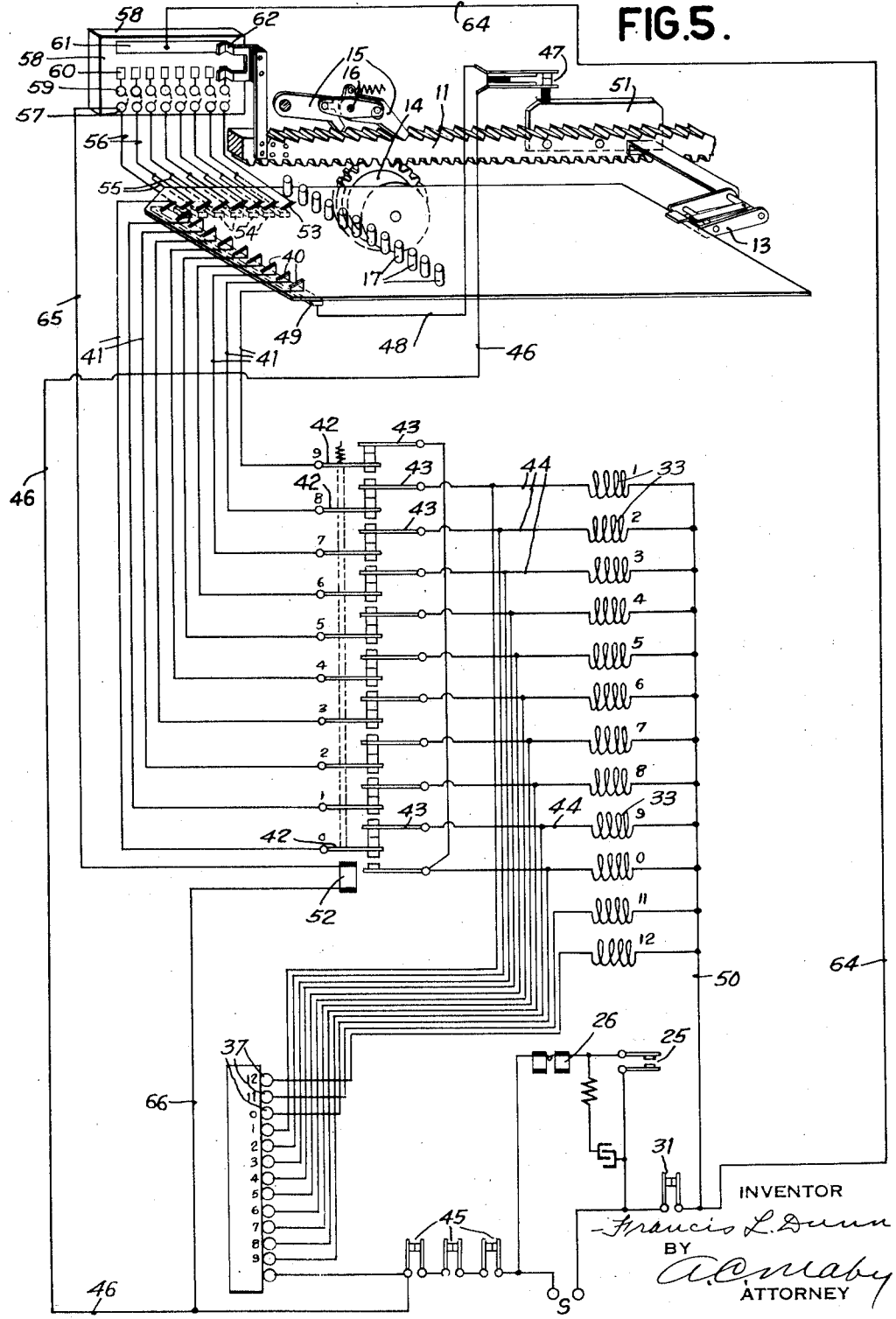
Fig. 5 is a wiring diagram of the circuit connections of the entire apparatus.

It will be observed, in Fig. 5, that the brushes 40 are normally connected to the interposer magnets 33 representing the "9" complement of the several brush positions. Thus, the uppermost brush 40 which reads the "0" position is connected to the lowermost blade 42 and thence through blade 43 and wire 44 to the "9" magnet 33. The remaining brushes 40 are similarly connected to their nine complement magnets 33. In this manner the columns of the record card, perforated by punches 17, will be analyzed by brushes 40 as the punched columns move step by step toward the left and circuits completed through the perforated columns will energize punch interposer magnets 33 to cause operation of the punches 17 to punch the nine complement in another column of the record card. The complete circuit may be traced as follows: from source S (Fig. 5), the usual protective contacts 45 in the punching mechanism, wire 46 and contacts 47, wire 48, common contact bar 49, perforation in the record card, corresponding brush 40, wire 41, blades 42 and 43, wire 44, magnet 33, wire 50, contact 31, back to source S. As explained above, energization of magnet 33 will depress the corresponding punch operating key to cause perforation of the record card in the selected position. Contact 47 is adapted to be closed by a shoe 51 attached to the escapement rack 11 and so arranged as to be closed during the period during which the data to be converted is analyzed and to be open at other times.

A magnet 52 is provided which, upon energization, will shift contact blades 42 and bring them into contact with the next adjacent lower contact blade 43. This action will connect the analyzing brushes 40 to interposer magnets 33 in a tens complement relationship; that is, each brush 40 will then be connected to the magnet 33 representing the tens complement of the brush position. The energization of magnet 52 will take place concurrently with the analysis of the column of the record card which is to be converted into its tens complement. Since, as pointed out above, this column may occur in any denominational order position, mechanism is provided for determining when such shifting of the contact blades 42 shall take place. This mechanism will now be described in connection with the drawings.

A number of sensing brushes 53 and individual cooperating contact blocks 54 (see Figs. 3 and 5) are provided and arranged to traverse the zero column of the record card. Each of these brushes is connected by a wire 55 to the block 54 of the adjacent lower order. These wires may best be noted in the diagrams of Figs. 6, 7, and 8. The brushes are also connected through wires 56 to plug sockets 57 arranged on a plug board 58. The contact block 54 of the highest order brush 53 is also connected through a wire 56 to a plug socket 57. Adjacent to each plug socket 57 is a companion socket 59 which has electrical connection to a commutator segment 60 which is adapted to be electrically connected to a common strip 61 by means of a conducting wiper 62 which is carried by the escapement rack 11. The wiper 62 is adapted to connect the segments 60 to the strip 61 as the escapement rack moves step by step toward the left and may be adjustably mounted on the rack in any suitable manner. With this arrangement there will be, at the time the brushes 40 read a column of the record card, a brush 53 in cooperation with the zero index point positions of the next several columns of the record card.

The operation of the device may best be explained by considering a particular example and may best be understood in connection with Figs. 6, 7, and 8 to which reference will now be had. Consider the problem in which the punch operator perforates the true number 0090700 in the first seven columns of the record card as shown in Fig. 2. After the units column of this figure has been perforated, the operator will advance the record card by operation of the usual space key or well-known automatic spacing devices, if desired, until the brushes 40 are in cooperation with the first column of the true number. Wiper 62 will previously have been adjusted along escapement rack 11 so that with the brushes 40 reading the highest order column of the true number, the wiper 62 will connect strip 61 with the segment 60 of the units order of the true number. At this time the several devices will occupy the relative positions as shown diagrammatically in Fig. 6. For purposes of illustration, the columns of the record card have been spread apart so as to show the circuit connections more clearly. At this time also the column of punches will be in position to perforate in the first column of the complement field of the record card. For the present example, this is column 10 and also at this same time the contact 47 will be closed so that a circuit will immediately be completed through the zero brush 40 to energize the "nine complement" magnet 33 which in turn will cause the "9" index point position in column 10 to be perforated, this being the nine complement of zero.

As an incident to this punching operation, the record card will be advanced one step to present its second column to the brushes 40 and a second circuit will be completed through the zero perforation in this column and will again energize the "nine complement" magnet 33, again spacing the record so that the brushes 40 analyze the third column in which the "9" perforation will cause energization of the "0" magnet 33, after which the record will again be spaced and the parts will be in the position shown in Fig. 7 in which it will be observed that the wiper 62 has been advanced with the record card so that it now bridges the strip 61 and the fourth segment 60 counting from the left.

In this position, the zero in the fourth column of the record card will control the punching of a nine in the thirteenth column of the card and the card will advance one step to the position shown in Fig. 8 in readiness to analyze the "seven" perforation in the fifth column, which is to be converted to its tens complement.

It may be stated here, that sockets 59 and 57 are connected by suitable plug connections 63 in the positions corresponding to the columns of the record card in which the true number is perforated. Immediately upon arrival of the record card in the position shown in Fig. 8, a circuit will be closed as follows: from source S to wire 64, common strip 61, wiper 62, segment 60 in the third position from the left, plug socket 59, plug connection 63, socket 57, wire 56, to brush 53 now reading the units column of the true number. The circuit will continue through the zero perforation in this column, contact block 54, wire 55 to brush 53 of the tens column, zero perforation in this column to the corresponding block 54, thence through its wire 56 to plug socket 57 of the highest order, thence through wire 65 to magnet 52, and then through wire 66 back to the source S. This circuit will be completed immediately and before the translating circuits through the brushes 40 become effective.

Energization of magnet 52 will shift the contacts 42, as explained, to connect the brushes 40 to the magnets 33 representing the tens complements of the brush positions and the circuit through the seven index point position in column five will energize the magnet 33 corresponding to the "three" punch to perforate a three in column fourteen of the record card. Spacing will thereafter take place and magnet 52 will again become energized through a circuit completed due to the position of wiper 62 on the segment 60 of the second column, which circuit will flow through the highest order brush 53, its block 54, to plug socket 57 of the highest order, and thence through magnet 52, shifting the contact blades 42 to cause punching of a zero in the tens order of the complement field and spacing the record card.

With the brushes 40 in cooperation with the units column of the true number and wiper 62 cooperating with the highest order segment 60, a circuit will be completed from source S, wire 64, strip 61, wiper 62, highest order segment 60, plug socket 59, connection 63, socket 57, wire 65, magnet 52, wire 66, to source S. This circuit is completed independently of the nature of the perforation of the units column and it is quite apparent that the units order will always be complemented to ten regardless of its value. After the units order of the complement has been perforated, contact 47 will open to disable brushes 40 and the card may be removed from the punch or further punching may be effected through manual operation of the keys 18 or under control of the master or pattern card in the well-known manner.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is as follows:

1. A punching machine for perforating record cards, including a plurality of sensing devices for analyzing perforations in index point positions in a record card, punching means comprising a corresponding number of punches, a sensing device and a punch being provided for each of the digits, means normally associating each punch with, and for control by, the sensing device corresponding to the nine complement of the punch value and further record controlled means for causing a change in the relationship between said punches and devices whereby each punch is associated with, and controlled by, the sensing device corresponding to the tens complement of the punch value.

2. In a machine of the class described, key controlled punches adapted to manually punch a field of a record card to represent any number, perforation sensing means operable upon completion of the manual punching operation for automatically sensing the perforations in said field and means controlled thereby for effecting automatic operation of said punches in accordance with the perforations sensed, to perforate another field of the same record to represent the tens complement of the number manually punched.

3. In a machine of the class described, keys for manually punching data representative of any number in a plurality of columns of a field of a record card, means for feeding said record to a data sensing station upon completion of the manual punching operation, means for sensing the manually punched data and means controlled by said sensing means for automatically punching data representative of the tens complementary value of said number in corresponding columns of another field of said record card.

4. A punching machine comprising in combination, manually controlled punching means for perforating a field of a record card to represent any number, means for sensing said perforations, and means controlled by said sensing means for causing automatic operation of said punches to perforate another field of said record card to represent the tens complement of said number.

5. In a machine of the class described, means for sensing a plurality of columns of a record card perforated to represent a number, punching devices for perforating a record card, means controlled by said sensing devices for determining the lowest denominational order of said number having a significant figure and further means controlled by said sensing means for causing said punching devices to effect perforations representative of a number in which denominational orders higher than said determined significant figure are complements of nine and other denominational orders are complements of ten.

6. In a machine of the class described, means for sensing a plurality of columns of a record card perforated to represent a number, recording devices, means controlled by said sensing devices for determining the lowest denominational order of said number having a significant figure and further means controlled by said sensing means for causing said recording means to record a number in which denominational orders higher than said determined significant figure are complements of nine and other denominational orders are complements of ten.

7. In a machine of the class described, means for sensing a plurality of columns of a record card perforated to represent a number, punching devices normally associated with and controlled by said sensing means to punch a number in which each order is the nine complement of the corresponding order of the number sensed and means controlled by said sensing means for changing said association whereby certain orders will be punched as tens complements of the corresponding orders of the number sensed.

8. The invention set forth in claim 7 in which further means is provided under control of the sensing means for determining in which orders the said change in association is to be effected.

FRANCIS L. DUNN.